UNITED STATES PATENT OFFICE.

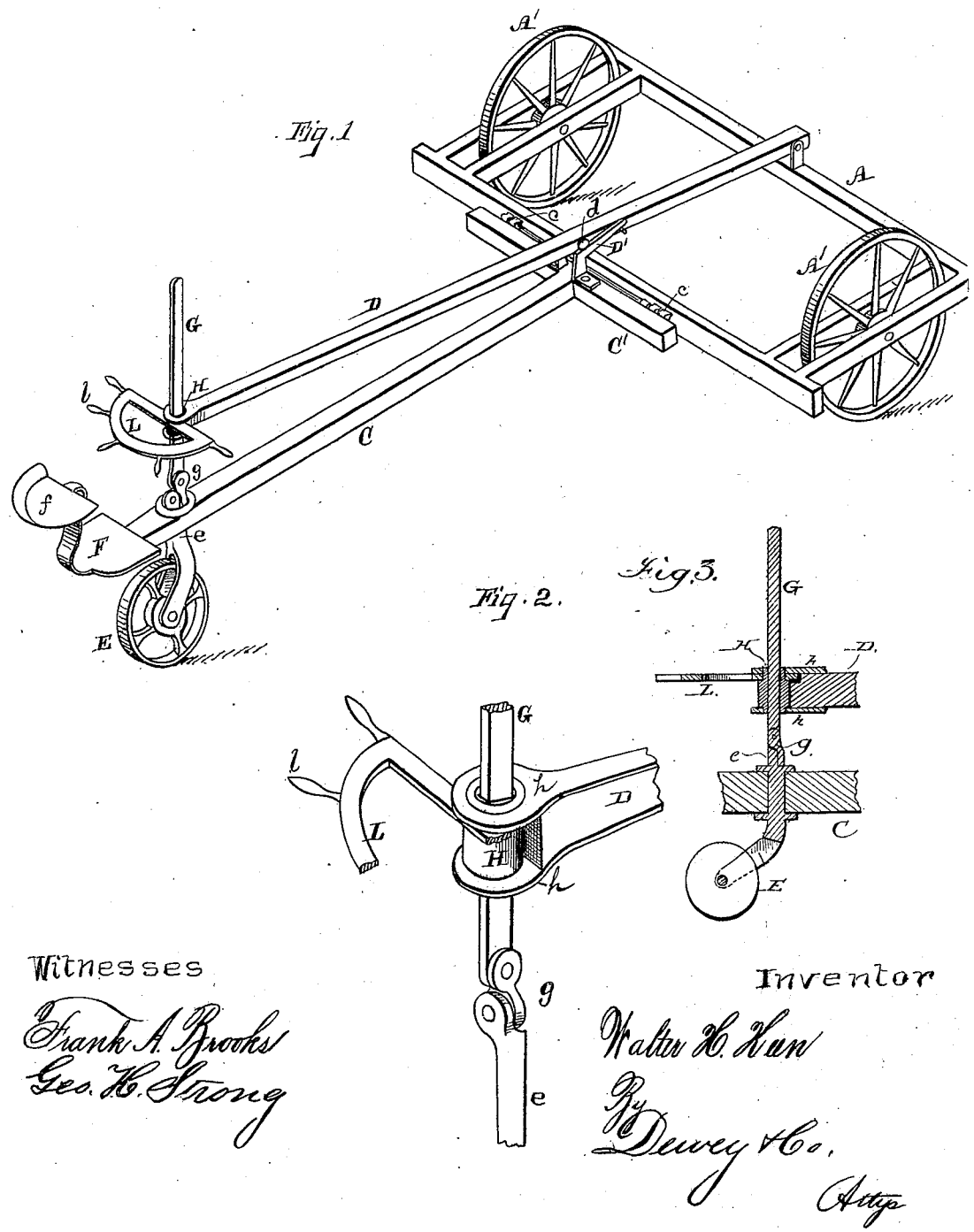

WALTER H. KEEN, OF WOODBRIDGE, CALIFORNIA.

GUIDING-HEADER.

SPECIFICATION forming part of Letters Patent No. 228,260, dated June 1, 1880.

Application filed March 31, 1880. (No model.)

*To all whom it may concern:*

Be it known that I, WALTER H. KEEN, of Woodbridge, county of San Joaquin, and State of California, have invented an Improvement in Guiding-Headers; and I hereby declare the following to be a full, clear, and exact description thereof.

My invention relates to certain improvements in that class of reaping-machines known as "headers," my improvements referring more particularly to the guiding mechanism.

My invention contemplates forming a peculiar jack-staff carrying the caster guide-wheel below, and arranged above as a guide for the cutter-bar lever, the whole being in front of the driver, so that a seat may be provided at the rear end of the beam, upon which the driver may sit during his work. The tiller for steering the header is swiveled on the rear end of the cutter-bar lever, and so combined with it as to serve also as a means of raising or lowering said lever.

My invention further consists in forming in a peculiar manner an automatically-movable fulcrum for the cutter-bar lever to keep the header on an equal balance, so that the cutter-bar is raised with little friction, and the strain relieved from the links connecting the cutter-bar frame with the pole carrying the guide-wheel and driver, as is fully illustrated in the accompanying drawings, in which—

Figure 1 is a perspective view of my invention. Fig. 2 is a detail of construction. Fig. 3 is a sectional view, showing the attachment of the jack-staff to the lever.

Let A represent the cutter-bar frame, said frame being mounted on the wheels A', in the usual manner. The rearwardly-extending pole C has a bar or head-brace, C', across its front end, which is connected, by hinges or links c, with the cutter-bar frame, as shown.

The regulating-lever D for the cutter-bar frame is swiveled to the front of the frame, and is provided with fulcrum-rollers d, which rest on the raised inclined bearings or guides D', for the purpose hereinafter described, these bearings being placed on the cross-bar of the pole, as shown.

The caster or guide wheel E has its spindle e swiveled in the pole C a short distance forward of the rear end of said pole, so as to leave room behind it for the driver's platform F and seat *f*. The jack-staff G is connected, by a universal joint, *g*, with the spindle of the guide-wheel, as shown, so that said jack-staff really forms a continuation or extension of said spindle. This jack-staff is made square or angular in cross-section, and slides through a sleeve, H, having a central slot of corresponding shape. This sleeve is placed between the clamps *h* on the end of the lever and journals in said clamps, as shown. This sleeve H is griped by or connected with a brace forming part of the section of a hand-wheel, L, having hand-spokes *l*. This hand-wheel answers as a handle to move the lever up or down on the jack-staff, and also as a tiller to guide the device by turning the caster-wheel through the jack-staff and spindle.

I have shown the hand-wheel as having five spokes; but more or less may be used, as desired. To guide the header in any desired direction the hand-wheel is moved by its spokes in either direction. As the brace of this wheel gripes the sleeve H, through which passes the square jack-staff connected with the spindle of the caster-wheel, when the hand-wheel is turned, and sleeve H with it, the jack-staff and spindle are turned also, altering the line of travel of the guide-wheel with relation to the pole, and altering the direction of the movement of the header accordingly.

When the center spoke is facing directly opposite the driver the header will then be moved ahead in a straight direction; but when he moves the outside handle on either side opposite him the header will then be turned in whichever direction he may wish to go.

The lever may at the same time be lifted or lowered to regulate the cutting-bar, since the sleeve connected with the hand-wheel and lever admits of said lever being moved up and down on the jack-staff without reference to the position of the guide-wheel.

The toggle joint or coupling of the jack-staff and spindle is necessary, since the angle of the jack-staff with relation to the pole must alter as the lever is raised or lowered, owing to said jack-staff passing through the sleeve on the end of the lever. No matter what the position of the spindle and guide-wheel may be, the angle of the jack-staff with relation to them is allowed to change according to the position of the lever.

The raised inclined bearings or guides D' on the head-brace of the pole sustain the weight of the lever D on its fulcrum-rollers. This loose fulcrum or rolling balance is much preferable to a simple hinge, since the position of the fulcrum is changed in proportion to the angle of inclination of the header, and there is consequently no difficulty in moving the lever up or down, as in the old way. The header is, moreover, kept on an equilibrium or balance.

With this device the driver may either sit or stand, as he chooses, and his hand-hold for both tiller and lever is always facing him. He can guide the header accurately, and at the same time attend to his lever carefully, his work being greatly lessened and simplified.

Having thus described my invention, what I claim as new, and desire to secure by Letters Patent, is—

1. In a grain-heading device, the combination of the lever-operating and steering apparatus, consisting of the guide-wheel E, with its spindle e, connected by a universal joint, g, with the angular jack-staff G, passing loosely through a sleeve, H, on the end of the cutter-bar lever D, and having a hand-wheel, L, all in front of the seat f and platform F, as shown, whereby the steering and lever-operating devices are both in front of the driver, substantially as and for the purpose herein described.

2. In combination with the spindle e of the guide or caster wheel E of the pole C of a header, A, the angular extension or jack-staff G, connected by a toggle-joint with the cutter-bar lever D, and passing through a sleeve on the end of said lever, which sleeve has the tiller or hand-wheel for operating the caster-wheel E, whereby the position of the lever may be altered with relation to the jack-staff without reference to the angle of the guide-wheel, although both are operated by the same hand-wheel, substantially as herein described.

3. In combination with the guide-wheel spindle e, lever D, and the jack-staff G for the cutter-bar regulation, the universal joint g, whereby the jack-staff automatically alters its angle with relation to the pole in accordance with the position of the lever, substantially as herein set forth.

4. In combination with the cutter-bar-regulating lever D of a header having a pole, C, the inclined bearings or guides D' and the fulcrum-rollers d, whereby the equilibrium or balance is maintained at any position of the lever, substantially as and for the purpose herein set forth.

In witness whereof I have hereunto set my hand.

WALTER HAMILTON KEEN.

Witnesses:
H. J. KEEN,
N. A. KNIGHT.